United States Patent
Chen et al.

(10) Patent No.: US 7,597,412 B2
(45) Date of Patent: Oct. 6, 2009

(54) COMPUTER ENCLOSURE WITH SIMPLE DRIVE BRACKET

(75) Inventors: Yun-Lung Chen, Tu-Cheng (TW); Da-Long Sun, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 658 days.

(21) Appl. No.: 11/317,127

(22) Filed: Dec. 22, 2005

(65) Prior Publication Data
US 2007/0013276 A1  Jan. 18, 2007

(30) Foreign Application Priority Data
Jul. 15, 2005  (CN)  .................... 2005 2 0061660 U (51) Int. Cl.
*A47B 97/00* (2006.01)

(52) U.S. Cl. ............... 312/223.2; 361/724; 361/679.33; 361/679.6

(58) Field of Classification Search ............. 312/257.1, 312/265.5, 265.6, 223.1, 223.2; 361/724, 361/725, 727, 683, 685, 679.01, 679.02, 361/679.31, 679.33, 679.37, 679.6
See application file for complete search history.

(56) References Cited

U.S. PATENT DOCUMENTS

| | | | | |
|---|---|---|---|---|
| 5,164,886 A | * | 11/1992 | Chang | 361/683 |
| 5,447,367 A | * | 9/1995 | Wei | 312/223.2 |
| 5,865,518 A | * | 2/1999 | Jarrett et al. | 312/223.2 |
| 6,000,767 A | | 12/1999 | Liu et al. | |
| 6,137,678 A | * | 10/2000 | Gebara et al. | 361/685 |
| 6,147,862 A | * | 11/2000 | Ho | 361/685 |
| 6,381,131 B1 | * | 4/2002 | Liu et al. | 361/685 |
| 6,473,295 B2 | * | 10/2002 | Chen | 361/683 |
| 6,646,872 B1 | * | 11/2003 | Chen | 361/685 |
| 6,714,409 B2 | * | 3/2004 | Chen | 361/685 |
| 6,826,039 B2 | | 11/2004 | Chen | |
| 6,935,604 B2 | * | 8/2005 | Chen | 248/694 |
| 6,969,131 B2 | * | 11/2005 | Chen et al. | 312/223.2 |
| 2004/0075974 A1 | * | 4/2004 | Chen | 361/683 |

* cited by examiner

Primary Examiner—James O Hansen
(74) Attorney, Agent, or Firm—Clifford O. Chi (57) ABSTRACT

A computer enclosure includes a base (10), a retaining clip (20), and a support plate (40). The base includes a top plate (14), a bottom plate (16), and a side plate (12) connecting with the top plate and the bottom plate. The retaining clip is secured to the side plate. The support plate is secured between the top plate and the bottom plate of the base, and spaced from and opposite to the retaining clip. The support plate together with the retaining clip can be adapted to receive at least one data storage device. A plurality of securing clips (41) is formed on the retaining clip and the support plate for locating the at least one data storage device thereon.

8 Claims, 6 Drawing Sheets

COMPUTER ENCLOSURE WITH SIMPLE DRIVE BRACKET

BACKGROUND OF THE INVENTION

1. Field of the Invention

The present invention relates to computer enclosures, and more particularly to a computer enclosure having a simple drive bracket for accommodating data storage devices, such as hard disk drives, floppy disk drives, CD-ROM (Compact Disk Read-Only Memory) drives, etc.

2. General Background

A typical computer enclosure includes a base, a cover, and a front bezel secured to a front end of the base. The base includes a side plate, a top plate, a bottom plate, a rear plate, and a front plate. The top plate, the bottom plate, the rear plate, and the front plate are formed at adjacent edges of the side plate, thereby forming an opening. The cover is used to cover the opening, and facilitates preventing EMI (Electro Magnetic Interference) leaking from the computer enclosure.

Furthermore, a drive bracket is usually installed into the base adjacent to the front plate, and accommodates a plurality of data storage devices therein. The drive bracket is generally secured to the base with a plurality of screws or stakes, and usually includes a bottom wall, and a pair of sidewalls extending from the bottom wall. Another kind of drive bracket includes a first bracket body and a second bracket body. Both the first and second bracket bodies are used to accommodate different data storage devices. The second bracket body is usually secured to a bottom wall of the first bracket body, which is secured to the base.

However, the typical computer enclosure usually has a complicated structure, more particularly it has a drive bracket with a complicated structure, thereby increasing the manufacturing cost and the amount of manufacturing material thereof.

What is needed, therefore, is a computer enclosure having a simple structure, more particularly having a simple drive bracket which reduces the manufacturing cost and the amount of manufacturing material thereof.

SUMMARY

A computer enclosure includes a base, a retaining clip, and a support plate. The base includes a top plate, a bottom plate, and a side plate connecting with the top plate and the bottom plate. The retaining clip is secured to the side plate. The support plate is secured between the top plate and the bottom plate of the base, and spaced from and opposite to the retaining clip. The support plate together with the retaining clip can be adapted to receive at least one data storage device.

Other advantages and novel features will be drawn from the following detailed description of preferred embodiments with attached drawings, in which:

DETAILED DESCRIPTION OF PREFERRED EMBODIMENTS

Figure 1:
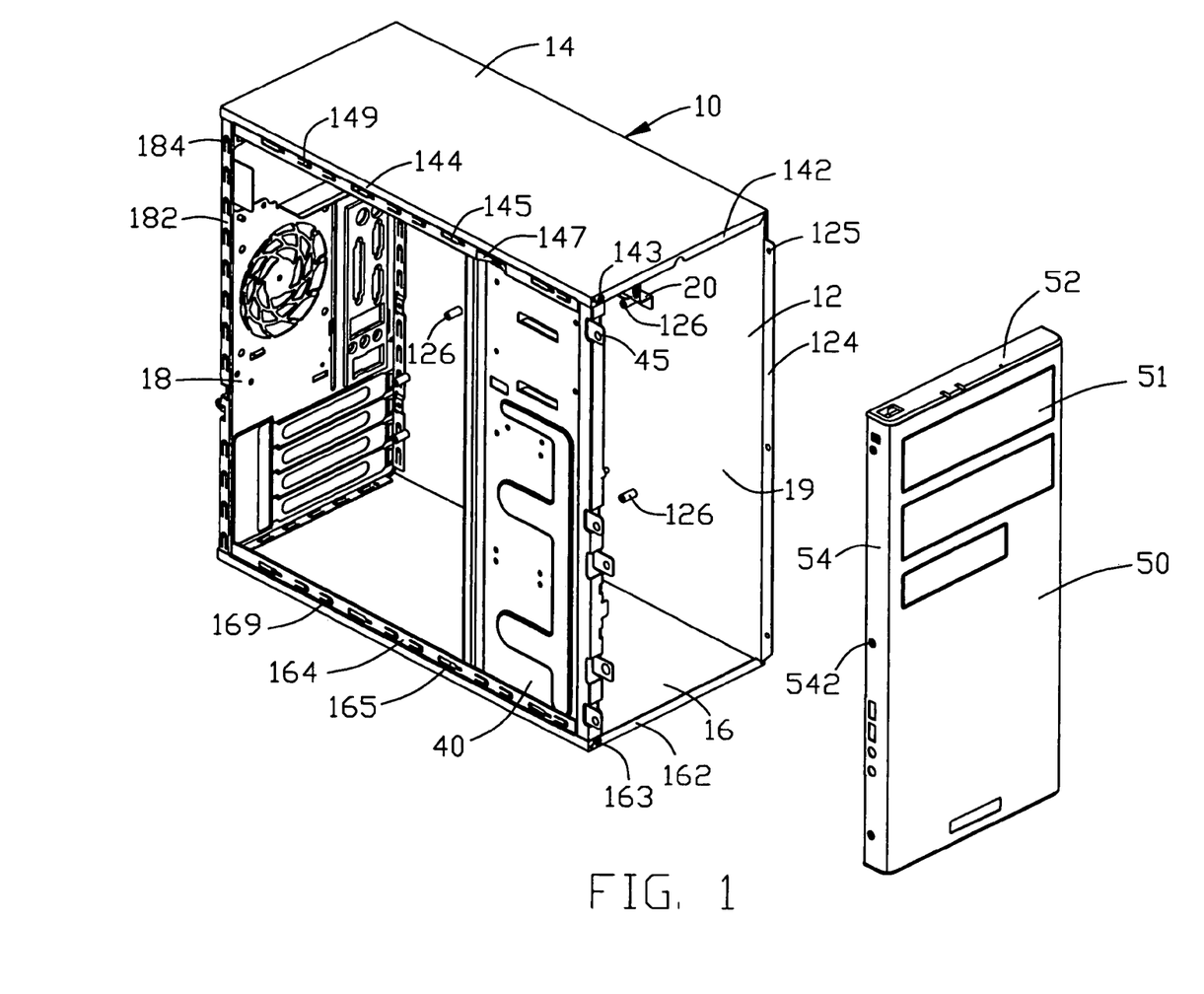
FIG. 1 is an exploded, isometric view of a computer enclosure in accordance with a preferred embodiment of the present invention, the computer enclosure including a front bezel, a base having a retaining clip, and a support plate secured to the base.
Figure 6:
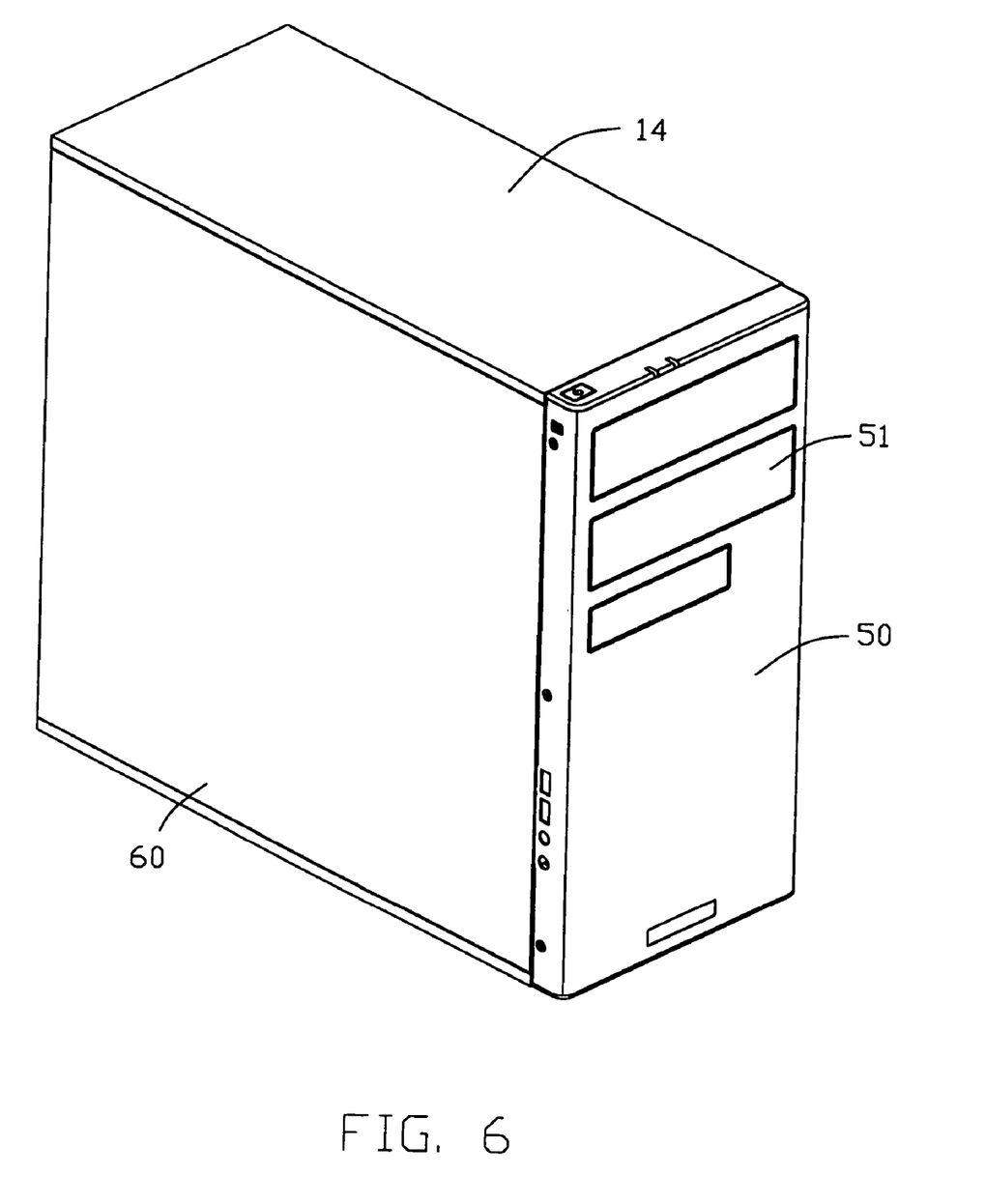
FIG. 6 is similar to FIG. 4, and showing a cover secured to the base.

Referring to FIGS. 1 and 6, an enclosure of an electronic device like a computer includes a base 10, a support plate 20, a front bezel 50, and a cover 60.

Figure 5:
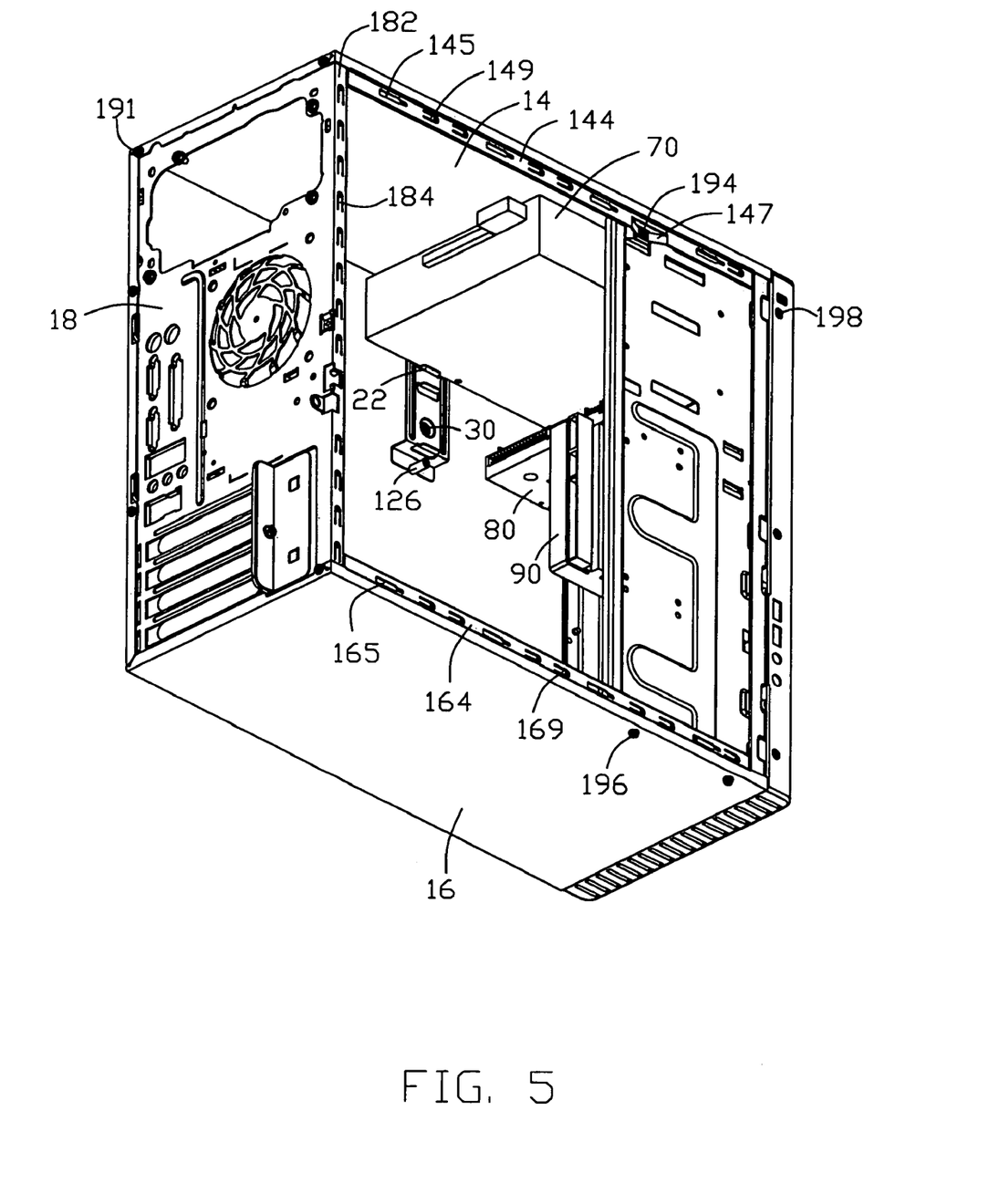
FIG. 5 is similar to FIG. 4, but viewed from another aspect.

The base 10 is generally U-shaped, and includes a side plate 12, a top plate 14, a bottom plate 16, and a rear plate 18. The top plate 14 and the bottom plate 16 are perpendicularly bent from opposite edges of the side plate 12 in a same direction. The rear plate 18 is fixed at a rear end of the base 10 with fasteners 191, such as screws, as shown in FIG. 5. A mounting flange 124 extends outwardly from a front edge of the side plate 12, and defines a plurality of screw holes 125 therein. A plurality of posts 126 each having a screw hole is provided at an inner surface of the side plate 12. A bent flange 142 and a positioning flange 144 extend downwardly from adjacent edges of the top plate 14, respectively. The bent flange 142 defines a mounting hole 143 at an end thereof. The positioning flange 144 defines a plurality of positioning holes 145 therein. A concave portion 147 with a through hole defined therein is formed on the positioning flange 144 adjacent to a front end thereof. A plurality of spaced resilient fingers 149 is formed on the positioning flange 144 by stamping, for preventing EMI (Electro Magnetic Interference) leaking from the base 10. A bent flange 162 and a positioning flange 164 extend upwardly from adjacent edges of the bottom plate 16, respectively. The bent flange 162 defines a mounting hole 163 at an end thereof. The positioning flange 164 defines a plurality of positioning holes 165 therein. A plurality of spaced resilient fingers 169 is formed on the positioning flange 164 by stamping, for preventing EMI leaking from the base 10. Two through holes (not visible) are defined in the bottom plate 16 adjacent to the positioning flange 164. The rear plate 18 has a support flange 182 connecting with the positioning flanges 144, 164 of the top plate 14 and the bottom plate 16. A plurality of spaced resilient fingers 184 is formed on the support flange 182 by stamping, for preventing EMI leaking from the base 10.

Figure 2:
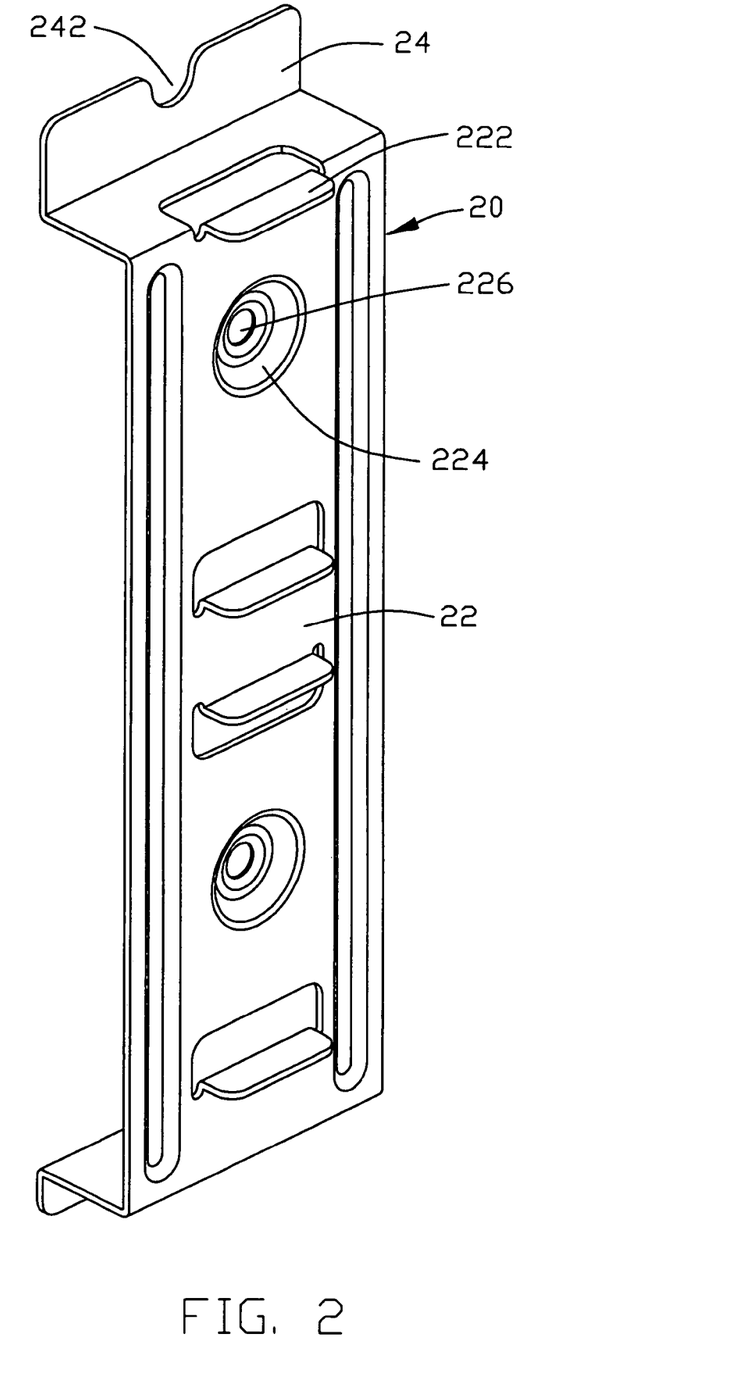
FIG. 2 is an enlarged, isometric view of the retaining clip of FIG. 1.

Referring particularly to FIG. 2, a retaining clip 20 is secured to the inner surface of the side plate 12 of the base 10, and includes a generally U-shaped main portion 22, and a pair of support portions 24. Two pairs of parallel securing clips 222 performing as a first retainer respectively protrude perpendicularly from the main portion 22. A concave portion 224 having a through hole 226 is formed on the main portion 22 between the clips of each pair of securing clips 222. The support portions 24 extend perpendicularly from opposite ends of the main portion 22 respectively, and each support portion 24 defines a cutout 242 therein.

Figure 3:
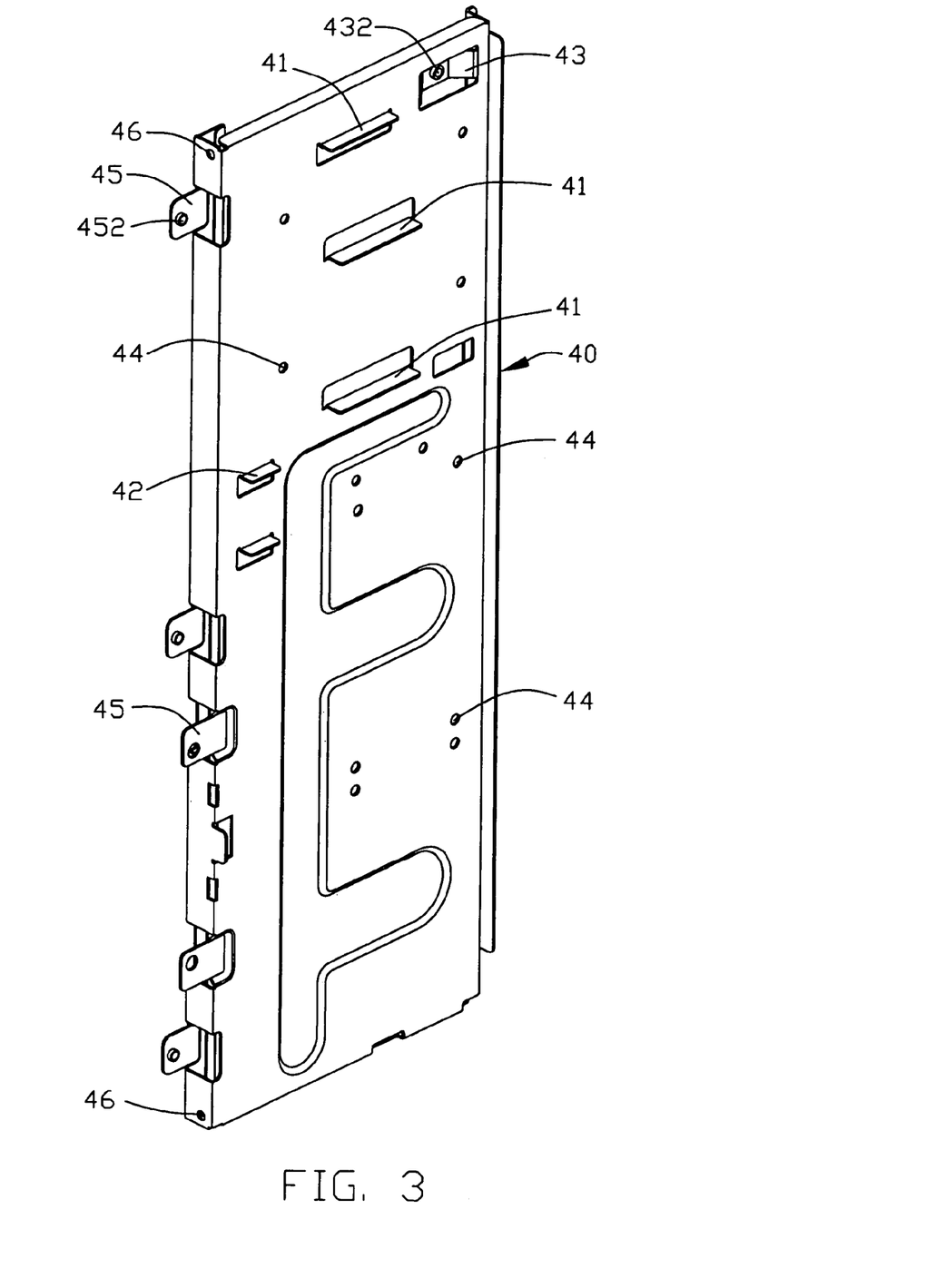
FIG. 3 is an enlarged, isometric view of the support plate of FIG. 1, and viewed from another aspect.

Referring also to FIG. 3, the support plate 40 is secured between the top plate 14 and the bottom plate 16. A width of the support plate 40 is generally the same as the length of a hard disk drive or a floppy disk drive. A plurality of securing clips 41 and a pair of locating clips 42 performing as a second retainer respectively protrude perpendicularly from a top portion of the support plate 40. The securing clips 41 correspond to the securing clips 222 of the support plate 20 for supporting CD-ROM drives. The locating clips 42 lie below the securing clips 41 for supporting the floppy disk drive. A length of each locating clip 42 is shorter than that of each securing clip 41. A plurality of through holes 44 is defined in the support plate 40.

A convex portion 43 is formed at an end portion of the support plate 40, corresponding to the convex portion 147 of the positioning flange 144 of the top plate 14. A screw hole 432 is defined in the convex portion 43. A plurality of mounting clips 45 extends outwardly from a sidewall of the support plate 40. Each mounting clip 45 defines a screw hole 452 therein. A pair of screw holes 46 is defined in opposite end portions of the sidewall of the support plate 40, corresponding to the mounting holes 143, 163 of the bent flanges 142, 162 of the bottom plate 14 and the top plate 16. The support plate 40 further defines a pair of screw holes (not visible) in a bottom wall thereof, corresponding to the through holes of the bottom plate 16.

Referring back to FIG. 1, the front bezel 50 is made from EMI-proof material. A plurality of openings (not labeled) is defined in the front bezel 50 for the CD-ROM drives and the floppy disk drive inserting therethrough. Each of the openings is covered with a bezel cover 51. The front bezel 50 includes a top wall 52 and a pair of sidewalls 54. A plurality of through holes 542 is defined in the sidewalls 52, corresponding to the screw holes 125 of the side plate 12 and the screw holes 452 of the support plate 40 respectively.

Figure 4:
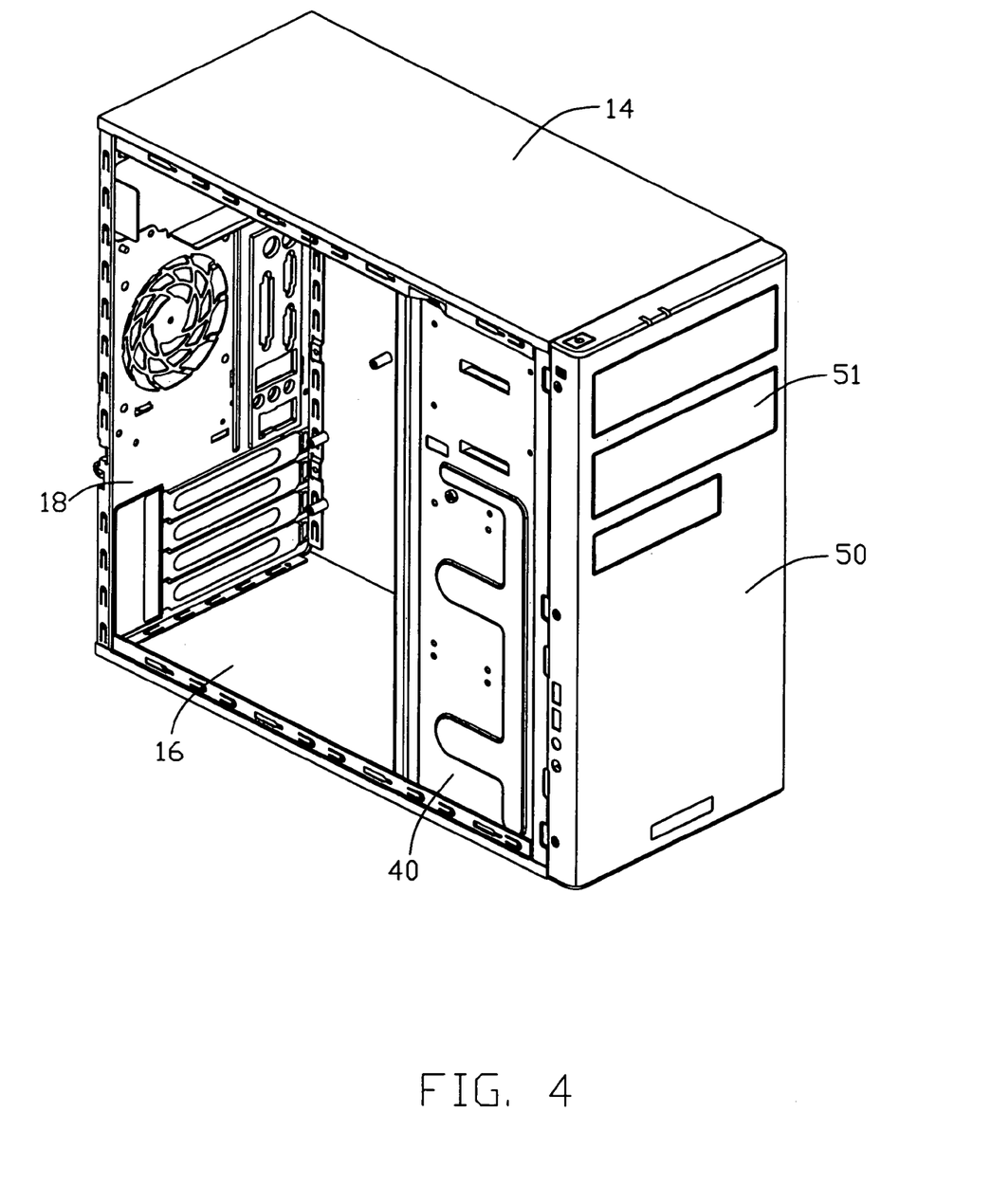
FIG. 4 is an assembled view of FIG. 1.

Referring also to FIGS. 4 and 5, in assembly, the retaining clip 20 is located on the inner surface of the side plate 12, with the cutouts 242 engaging with two posts 126, thereby aligning the through holes 226 of the concave portions 224 with the screw holes of the other two posts 126. Two screws 30 are engaged in the screw holes of the post 126 through the through holes 226, thereby securing the retaining clip 20 to the side plate 12.

The support plate 40 is placed between the top plate 14 and the bottom plate 16. The support plate 40 abuts against the positioning flanges 144, 164. The through hole of the concave portion 147 of the positioning flange 144 is aligned with the screw hole 432 of the concave portion 43, and then a screw 194 is mounted therein. The screw holes 46 of the sidewall of the support plate 40 are aligned with the mounting holes 143, 163 of the top plate 14 and the bottom plate 16, and then two screws (not shown) are mounted therein. The screw holes of the bottom wall of the support plate 40 are aligned with the through holes of the bottom plate 16 respectively, and two screws 196 are mounted therein, as best shown in FIG. 5. The support plate 40 is thus secured to the base 10, and an opening 19 is formed and surrounded by the base 10 and the support plate 40, as shown in FIG. 1.

In assembly of the front bezel 50, a plurality of screws 198 is engaged in the screw holes 452 of the mounting clip 45 of the support plate 40, through the through holes 542 of the front bezel 50. The front bezel 50 is thus mounted to the base 10. Then a cover 60 is attached to the base 10 above the support plate 40, through a plurality of hooks (not visible) locked into the positioning holes 145, 165 of the top plate 14 and the bottom plate 16. The cover 60 is mechanically and electrically in contact with the resilient fingers 149, 169, 184 of the top plate 14, the bottom plate 16, and the rear plate 18 respectively, thereby preventing EMI leaking from the base 10.

In use, the cover 60 is disassembled from the base 10. The bezel cover 51 is removed from the bezel 50. Then the CD-ROM drive can be inserted through the opening of the bezel 50, and positioned between the corresponding securing clips 222, 41 of the retaining clip 20 and the support plate 40. Two screws (not shown) are engaged in the CD-ROM drive, through the through opening 44 defined between the two securing clips 41 for stably fixing the CD-ROM drive. The installation of the floppy disk drive is similar to that of the CD-ROM drive, except that the floppy disk drive is supported on the locating clips 42 of the support plate 40 and the edge of the opening of the front bezel 50. And a plurality of screws is engaged in the floppy disk drive through the through hole 44 below the locating clips 42, thereby securing the floppy disk drive to the base 10.

It is to be understood, however, that even though numerous characteristics and advantages have been set forth in the foregoing description of preferred embodiments, together with details of the structures and functions of the preferred embodiments, the disclosure is illustrative only, and changes may be made in detail, especially in matters of shape, size, and arrangement of parts within the principles of the invention to the full extent indicated by the broad general meaning of the terms in which the appended claims are expressed.

We claim:

1. A computer enclosure comprising:
   a base comprising a top plate, a bottom plate, and a side plate connecting with the top plate and the bottom plate;
   a retaining clip secured to the side plate; and
   a support plate secured between the top plate and the bottom plate of the base, the support plate being generally parallel to the side plate and separated from the retaining clip, wherein the support plate together with the retaining clip can be adapted to receive at least one data storage device;
   wherein a plurality of securing clips is formed on the retaining clip and the support plate, for locating the at least one data storage device thereon;
   wherein a pair of locating clips is provided on the support plate below the securing clips for supporting another data storage device;
   wherein the retaining clip comprises a generally U-shaped main body, and the securing clips are formed on the main body;
   wherein at least one post having a screw hole is arranged at the side plate, and the main body of the retaining clip defines at least one through hole aligned with the screw hole of the at least one post, thereby receiving a fastener therein for positioning the retaining clip on the side plate.

2. The computer enclosure as described in claim 1, wherein a pair of support portions each defining a cutout therein extends from the main body, and a pair of posts is arranged at the side plate engaging in the cutouts of the support portions, thereby positioning the retaining clip on the side plate.

3. The computer enclosure as described in claim 1, wherein the support plate connects with the top plate and the bottom plate, thereby forming an opening, which is surrounded by the base and the support plate.

4. The computer enclosure as described in claim 3, wherein the side plate of the base has a mounting flange, the support plate has a plurality of mounting clips, and a front bezel is secured to the mounting flange and the mounting clips for covering the opening.

5. A computer enclosure comprising:
   a base comprising a side plate, a top plate, and a bottom plate, the top plate and the bottom plate extending from the side plate;
   a support plate secured between the top plate and the bottom plate of the base, thereby forming an opening which is surrounded by the support plate and the base, the support plate being generally parallel to the side plate; and
   a front bezel secured to the base for covering the opening;
   wherein a retaining clip is secured to the side plate and separated from the support plate, the support plate together with the retaining clip is adapted for receiving at least one data storage device;

wherein a plurality of securing clips is formed on the retaining clip and the support plate for locating the at least one data storage device thereon;

wherein a pair of locating clips is provided on the support plate below the securing clips for supporting another data storage device;

wherein the retaining clip comprises a generally U-shaped main body, and the securing clips are formed on the main body;

wherein a pair of support portions each defining a cutout therein extends from the main body, and a pair of posts is arranged at the side plate engaging in the cutouts of the support portions, thereby positioning the retaining clip on the side plate.

6. The computer enclosure as described in claim 5, wherein at least one post having a screw hole is arranged at the side plate, and the main body of the retaining clip defines at least one through hole aligned with the screw hole of the at least one post, thereby receiving a fastener therein for positioning the retaining clip on the side plate.

7. The computer enclosure as described in claim 5, wherein the support plate connects with the top plate and the bottom plate, thereby forming an opening, which is surrounded by the base and the support plate.

8. The computer enclosure as described in claim 7, wherein the side plate of the base has a mounting flange, the support plate has a plurality of mounting clips, and the front bezel is secured to the mounting flange and the mounting clips for covering the opening.

* * * * *

UNITED STATES PATENT AND TRADEMARK OFFICE
CERTIFICATE OF CORRECTION

PATENT NO.       : 7,597,412 B2
APPLICATION NO.  : 11/317127
DATED            : October 6, 2009
INVENTOR(S)      : Chen et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 946 days.

Signed and Sealed this

Twenty-eighth Day of September, 2010

David J. Kappos
*Director of the United States Patent and Trademark Office*